United States Patent [19]

McCarty et al.

[11] Patent Number: 5,139,682
[45] Date of Patent: Aug. 18, 1992

[54] ZEOLITE ENHANCED ORGANIC BIOTRANSFORMATION

[75] Inventors: Perry L. McCarty, Stanford; Lisa M. Alvarez, Palo Alto, both of Calif.

[73] Assignee: The Board of Trustees of Leland Stanford Junior University, Stanford, Calif.

[21] Appl. No.: 795,698

[22] Filed: Nov. 21, 1991

Related U.S. Application Data

[63] Continuation of Ser. No. 619,070, Nov. 28, 1990, abandoned.

[51] Int. Cl.[5] .............................................. B01D 15/04
[52] U.S. Cl. .................................... 210/670; 55/75; 210/631; 210/691

[58] Field of Search .................... 55/75; 210/631, 670, 210/690, 691, 908

[56] References Cited

U.S. PATENT DOCUMENTS 4,098,690 7/1978 Semmens ............................ 210/903

Primary Examiner—Ivars Cintins
Attorney, Agent, or Firm—McCubbrey, Bartels, Meyer & Ward

[57] ABSTRACT

An improved method of removing contaminants from gas or liquids is disclosed. The contaminated fluid is brought into contact with a zeolite. The zeolite is then transferred to a vessel containing a bacterial culture which is used to regenerate the zeolite.

1 Claim, 2 Drawing Sheets

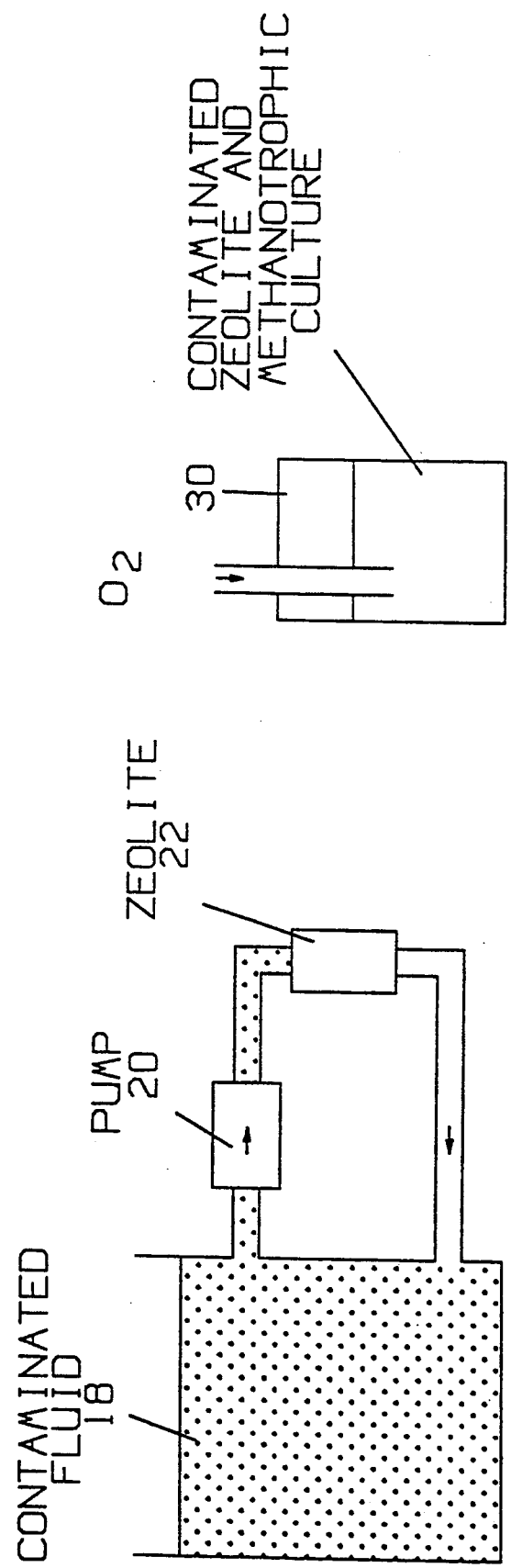

ZEOLITE ENHANCED ORGANIC BIOTRANSFORMATION

This is a continuation of application Ser. No. 619,070 filed Nov. 28, 1990, now abandoned.

FIELD OF THE INVENTION

The present invention relates to the removal of contaminants from gas and liquid phase, and more particularly, to a method for removing contaminates in such a manner as to facilitate the microbial transformation of the contaminants.

BACKGROUND OF THE INVENTION

Groundwater and surface water contamination by toxic organic pollutants has become an increasingly important environmental problem. The contaminants often consist of low molecular weight organic compounds that are hydrophobic and/or volatile. Such contaminants are of concern both in terms of water and air pollution. These compounds are often found in trace concentrations and are not removed by conventional water treatment systems.

One prior art method of reducing such contaminants is air stripping. In this method, the contaminant is removed from water by forcing air through the water. Volatile contaminants are transferred from the aqueous phase to the air. While this process purifies the water, it pollutes the air, since the process does little to transform the compounds to a harmless form.

Some prior art systems for removing hydrophobic contaminants are based on activated carbon. Activated carbon is highly porous and is capable of adsorbing many contaminants from both liquid and gas phases. The contaminated gas or liquid is typically passed through an activated carbon bed. The contaminants are then adsorbed by the activated carbon until the capacity of the bed is reached. At this point, the activated carbon must be regenerated. The regeneration process typically involves heating the carbon to extremely high temperatures at high pressures. This process is expensive and results in significant carbon loss. In addition, the adsorptive capacity of activated carbon is low for many contaminants.

An alternative method for regenerating the activated carbon involves biological regeneration. In this method microorganisms consume the contaminants trapped on the activated carbon. Unfortunately, the contaminants are often released too slowly from the activated carbon for such biological regeneration to be practical.

Another problem inherent in systems based on activated carbon is the lack of selectivity. Activated carbon sorbs a wide range of organic compounds. The various contaminants compete for the available active adsorption sites. Generally, it would be advantageous to remove only the low molecular weight compounds of concern by sorption on the activated carbon, thereby effectively increasing the capacity of the activated carbon system. Unfortunately, the heterogeneous nature of activated carbon makes such selective sorption impossible. As a result, more activated carbon is required to remove the low molecular weight contaminants of interest than would be the case if a more selective material were available.

Decontamination systems utilizing microbiological degradation of the contaminants are also known to the prior art. Unfortunately, the concentration of contaminants in the waste stream is seldom at the optimal concentration for the microorganisms to achieve rapid transformation of the contaminants. The efficiency of such systems is often very dependent on the concentration of the substrate being transformed. At low levels of contamination, large volumes of water or gas must be brought into contact with the microorganisms for significant periods of time. The cost of the reaction vessels for accomplishing this is high. In addition, the mixing processes needed to achieve rapid biotransformation can result in the release of the organic material into the atmosphere. Finally, biofouling of the effluent often occurs. Such fouling results in a high maintenance cost. At high concentrations, the contaminants to be transformed or other contaminants present in the water or gas may become toxic to the microorganisms.

In addition, some contaminants cannot be used as primary substrates for energy and growth by the microorganisms but can be transformed or destroyed through cometabolism. Cometabolism is the fortuitous transformation of one substrate by an organism that is utilizing a substrate for energy or growth. Providing the substrate in the waste stream is difficult in many cases.

Broadly it is an object of the present invention to provide an improved decontamination method for removing small molecular weight organic compounds.

It is a further object of the present invention to provide a decontamination method which does not require pryrolysis of activated carbon.

It is yet another object of the present invention to provide a microbial decontamination process which is less sensitive to the concentration of the contaminants in the water or gas stream to be decontaminated.

It is another object of the present invention to provide a microbial decontamination process which is less sensitive to the presence of large molecular weight organic compounds in the waste stream being decontaminated.

It is a still further object of the present invention to provide a microbial decontamination system which does not require large reaction vessels for holding the contaminated water or gas in contact with the microorganisms.

It yet another object of the present invention to provide a microbial contamination system which has reduced biofouling.

It is a still further object of the present invention to provide a microbial decontamination system in which the degradation of contaminants via cometabolism may be enhanced.

These and other objects of the present invention will become apparent to those skilled in the art from the following detailed description of the present invention and the accompanying drawings.

SUMMARY OF THE INVENTION

The present invention comprises a method for removing a contaminant from a gas or liquid. The gas or liquid is brought into contact with a zeolite that will sorb said contaminant. The zeolite is then separated from the gas or liquid in question. The contaminated zeolite is then regenerated by incubating the zeolite with a bacterial culture. In the preferred embodiment of the present invention, zeolite is regenerated through cometabolism by a methanotrophic culture.

BRIEF DESCRIPTION OF THE DRAWINGS

FIG. 1 illustrates the decontamination of a fluid using the zeolite.

FIG. 2 illustrates the regeneration of the zeolites.

DETAILED DESCRIPTION OF THE INVENTION

Figure 3:
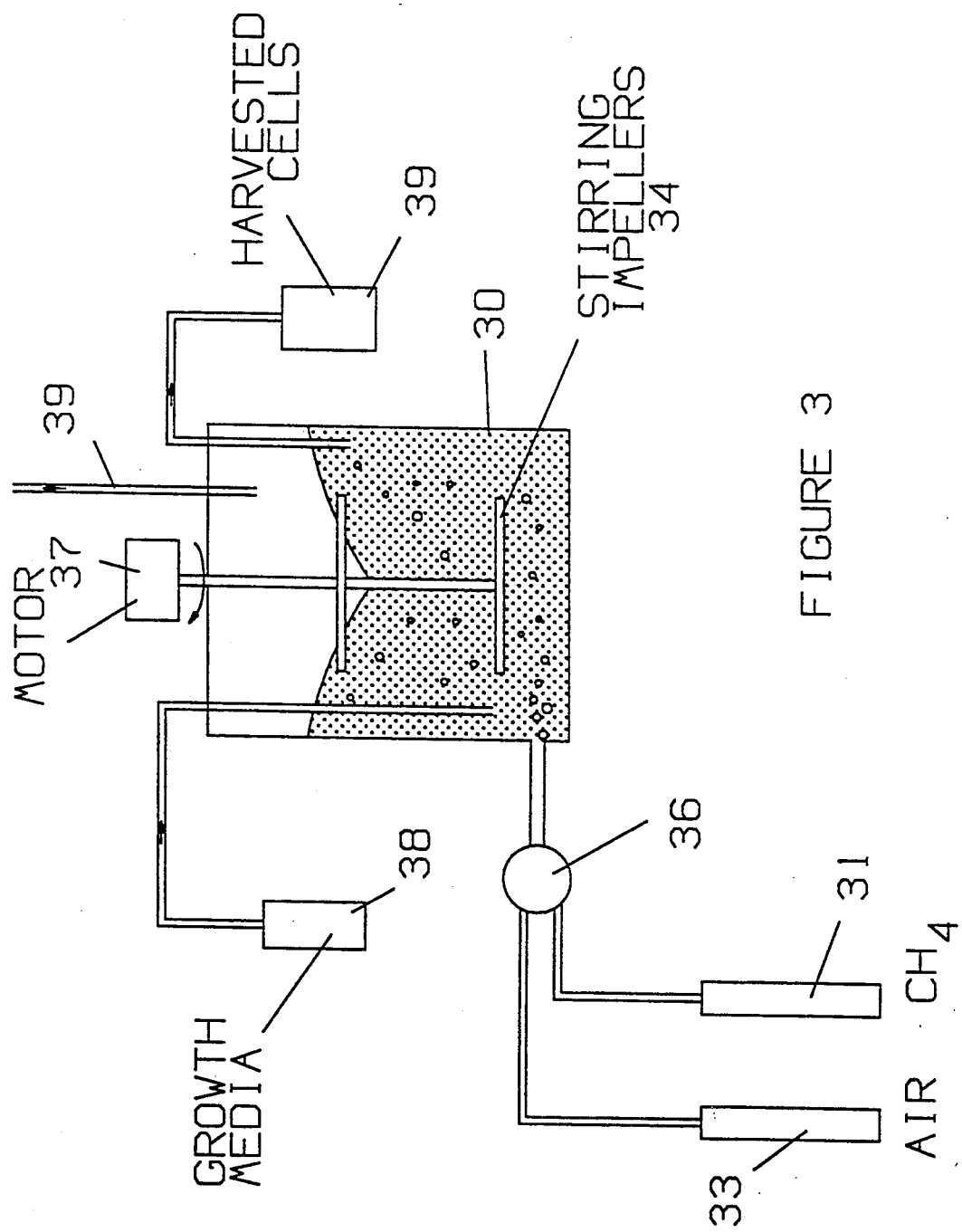
FIG. 3 is a block diagram of a chemostat system for generating the methanotrophic culture used in regenerating the zeolites.

The method of the present invention may be viewed as comprising two steps. In the first step, which is illustrated in FIG. 1, the contaminated water or gas 18 is brought into contact with the zeolites 22 which selectively sorb the contaminants of interest. This step can be accomplished by pumping the water or gas through a bed of zeolite utilizing a pump 20. Alternatively, the zeolite may be mixed with the contaminated water and then separated via filtration or sedimentation. The water leaving the zeolite is then either recycled back to the reservoir or discharged.

In the second step, the zeolites are regenerated via a microbiologically based biotransformation of the contaminants. This transformation converts the contaminants to a form that will no longer be retained in the pores of the zeolite. The regeneration is preferably carried out in a separate vessel as shown in FIG. 2. The contaminated zeolites are mixed with a bacterial culture such as a mixed culture of methanotrophs in a vessel 30. For reasons to be explained below, oxygen is injected into the culture during regeneration. If the bacterial culture can use the contaminant as a primary substrate, then any additional nutrients required for growth must also be added. If the regenerative process relies on cometabolism, than a methanotrophic culture may be used. The manner in which the methanotrophic culture is produced will be discussed in more detail below.

Natural and synthetic zeolites are characterized by a well defined microporous crystalline structure. An example of a synthetic zeolite capable of isolating chemical contaminants for liquids and gas is silicalite (U.S. Pat. No. 4,061,724) which consists of a crystalline silica oxide which is highly hydrophobic. Chemicals having an affinity for the zeolite become trapped and concentrated within the cage structure of the zeolite crystal. It has been shown that a variety of aldehydes, acids, esters, ethers, alcohols, ketones, nitriles, and halogenated species can be accumulated by a zeolite in this manner.

Unlike activated carbon, zeolites will selectively sorb molecules within a specific molecular diameter range as determined by the crystalline structure. For example, silicalite contains micropores of uniform diameter in the size range of low molecular weight organic molecules. The hydrogen bonding which causes water molecules to be excluded from the pores makes the sorbent hydrophobic and enables silicalite to be used to isolate nonpolar organics from water. In the case of silicalite, only molecules with diameters smaller than 6 angstroms are sorbed. Hence, the sorption capacity of the zeolite for the desired small molecular species will not be reduced by the presence of larger molecules. Furthermore, it is found experimentally that zeolites have a faster rate of sorption than activated carbon and may take up a greater mass of contaminant per unit mass of sorbent than is obtained with activated carbon.

The concentration of the contaminant on the zeolite results in an increased microbial transformation of the contaminant than would be obtained if the contaminated water or gas itself was brought into contact with the microorganisms. In addition, the loss of the contaminants to the atmosphere is substantially reduced because the zeolite traps the contaminant until the microorganisms transform the contaminants. Furthermore, the size of the bio-reactor needed to perform the biotransformation is substantially smaller, since the dilute contaminants from a large volume of water or gas can be concentrated in a small amount of zeolite. The process also has the advantage of allowing for the separate optimization of the removal and biotransformation processes. Finally, the zeolite shields the microorganisms from toxic levels of the contaminants.

The manner in which the present invention operates may be more easily understood with reference to an exemplary system and method according to the present invention for removing trichloroethylene (TCE) from aqueous solutions. It was determined that the mass of TCE sorbed by silicalite could be modeled by the following Langmuir equation:

$$q_{eq} = Q_0 b S_{eq}/(1 + b S_{eq})$$

where at equilibrium
$q_{eq}$ = the mass of TCE sorbed per mass of silicalite
$S_{eq}$ = aqueous concentration of TCE
$Q_0$ = maximum TCE sorption capacity of silicalite(mass/mass)
b = constant related to the energy of sorption.

Sufficient silicalite is added to the aqueous solution to be purified to reduce the concentration to the desired value. Equilibrium times have been found experimentally to be less than one hour for initial TCE concentrations of 12 mg/l. The silicalite may be added to the aqueous solution and mixed therewith. After mixing, the silicalite is separated from the aqueous phase by physical means such as filtration or sedimentation. Alternatively, the aqueous solution may passed through a column in which the silicalite has been immobilized.

Once the silicalite has sorbed the TCE, the silicalite is transferred to a reactor for regeneration. Here, TCE is degraded cometabolically by methanotrophs. In the preferred embodiment of the present invention, a methanotrophic culture which has been previously prepared by growth of suitable organisms in a chemostat is utilized for the regeneration. The manner in which the cells are prepared will be discussed in more detail below. For the purposes of the present discussion, it is sufficient to note that methanotrophic cultures that have been grown on methane and oxygen will degrade TCE and like chemicals. In the presence of methane, the organisms will preferentially utilize the methane for growth rather than the TCE. Hence, the methanotrophic culture must be deprived of methane during the degradation of the TCE in order to achieve high degradation rates. That is, the cells are first grown on methane and oxygen. Then the cells are transferred to the reactor containing the silicalite. No methane is present in the reactor; however, oxygen is supplied to the cells. When the culture is deprived of methane, the various species of cells therein degrade the TCE to $CO_2$ and $H_2O$, thereby rendering the toxic chemical harmless.

Methanotrophic organisms are easily obtained from a number of natural sources. Such organisms are routinely found in soil samples. In one embodiment of the present invention, a suitable methanotrophic culture was generated by seeding a chemostat culture with a soil sample taken from an aquifer in Mountain View, Calif. The culture is enriched and grown as a 7.5 liter mixed culture in a 10 liter baffled chemostat 30 as shown in FIG. 3. Chemostat 30 is continuously fed with a mixture of methane and air. The methane 31 and air 33 are mixed in a mixing valve 36 prior to the gases being introduced into chemostat 30. Chemostat 30 includes stirring impellers 34 which are run by a motor 37. The impellers insure that the gas mixture is mixed with the culture. The unused gas mixture is collected through a tube 39.

Chemostat 30 is initially seeded with a soil sample or some other source of methanotrophic organisms. Chemostat 30 is operated with a 9-day detention time; 0.85 liters of the media is replaced once daily. New media is introduced from a reservoir 38 and a like volume of culture harvested into reservoir 39. The mixed culture media contains the following mineral salts dissolved in deionized water: 200 mg/l $MgSO_4.7H_2O$, 20 mg/l $CaCl_2.2H_2O$, 1000 mg/l $NaNO_3$, 3 mg/l $FeSO_4.7H_2O$, 40 mg/l $KCl$, 160 mg/l $KH_2PO_4$, 184 mg/l $Na_2HPO_4$, 70 µg/l $ZnSO_4.7H_2O$, 20 µg/l $MnCl_2.4H_2O$, 20 µg/l $H_3PO_4$, 100 µg/l $CoCl_2.6H_2O$, 10 g/l $CuCl_2$, 20 µg/l $NiCl_2.6H_2O$, and 30 µg/l $Na_2MoO_4.2H_2O$. A mixture of 10% methane in air is constantly injected into the chemostat bottom at a rate of 280 ml/min, and high velocity mixing (200 RPM) is maintained to facilitate methane and oxygen transfer to the liquid phase.

The concentration of methanotrophic bacteria to silicalite is not critical during regeneration. In one experiment, 1.5 mg of cells from the above described chemostat culture was added to 8.8 ml vials containing 7000 µg/l of TCE which had been equilibrated with 1 mg of silicalite for one day prior to the addition of the cells. After 21 hours, more than 90% of the TCE was converted.

The cometabolic transformation process requires a source of reducing power. The methanotrophic culture has some internal reducing power when it is transferred from the chemostat. If sufficient cells are utilized, no further reducing power will be needed. That is, the internal reducing source is sufficient to convert all of the TCE. If additional reducing power is needed, a concentration of 20 mM sodium formate may be utilized in the transformation step.

It should be noted that the above culture is grown and maintained in non-sterile conditions. The culture includes a number of different organisms. Such cultures are preferred over a plurality of separately cultured strains of micro-organisms in sterile conditions. It is advantageous to provide decontamination processes which may be used at waste treatment plants or like sites. Such sites are poorly equipped to maintain and propagate pure cultures. In addition, the cost of producing and maintaining pure cultures is significantly higher than that of utilizing a mixed culture derived from a soil sample or the like.

There has been described herein a novel method for decontaminating liquid and gas phase systems. Various modifications to the present invention will become apparent to those skilled in the art from the foregoing description. Accordingly, the present invention is to be limited solely by the scope of the following claims.

What is claimed is:

1. A method for removing a contaminant from a gas or liquid comprising the steps of:
   bringing said gas or liquid into contact with a zeolite that will sorb said contaminant;
   separating said zeolite from said gas or liquid; and
   regenerating said zeolite by incubating said zeolite with a bacterial culture that degrades said contaminant to $CO_2$ and $H_2O$.

* * * * *

UNITED STATES PATENT AND TRADEMARK OFFICE
CERTIFICATE OF CORRECTION

PATENT NO. : 5,139,682
DATED : August 18, 1992
INVENTOR(S) : McCarty, et al.

It is certified that error appears in the above-identified patent and that said Letters Patent is hereby corrected as shown below:

Column 5, line 24, delete "10 g/l" and insert therefor --10 µg/l--.

Column 2, line 46, after "it" insert --is--.

Column 4, line 8, delete "dilute".

Column 4, line 40, after "may" insert therefor --be--.

Signed and Sealed this

Fifth Day of October, 1993

Attest:

BRUCE LEHMAN

Attesting Officer

Commissioner of Patents and Trademarks